United States Patent
Shen et al.

(10) Patent No.: US 11,200,464 B2
(45) Date of Patent: Dec. 14, 2021

(54) INFORMATION PROCESSING APPARATUS AND INFORMATION PROCESSING METHOD

(71) Applicant: FUJITSU LIMITED, Kawasaki (JP)

(72) Inventors: Wei Shen, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 16/744,220

(22) Filed: Jan. 16, 2020

(65) Prior Publication Data
US 2020/0302246 A1 Sep. 24, 2020

(30) Foreign Application Priority Data
Mar. 21, 2019 (CN) .......................... 201910217426.5

(51) Int. Cl.
*G06K 9/62* (2006.01)
*G06N 3/04* (2006.01)

(52) U.S. Cl.
CPC ......... *G06K 9/6269* (2013.01); *G06K 9/6257* (2013.01); *G06K 9/6263* (2013.01); *G06N 3/0454* (2013.01)

(58) Field of Classification Search
CPC .. G06K 9/6269; G06K 9/6263; G06K 9/6257; G06K 9/6267; G06K 9/6262; G06N 3/0454; G06N 3/08
USPC ......................................................... 382/224
See application file for complete search history.

(56) References Cited

U.S. PATENT DOCUMENTS

| | | | | |
|---|---|---|---|---|
| 10,430,946 | B1* | 10/2019 | Zhou ................. | G06N 3/0454 |
| 2019/0049540 | A1* | 2/2019 | Odry ................. | G01R 33/5608 |
| 2019/0325269 | A1* | 10/2019 | Bagherinezhad .. | G06K 9/00771 |
| 2020/0285888 | A1* | 9/2020 | Borar ................. | G06K 9/6255 |

OTHER PUBLICATIONS

Hou, S., et al., "DualNet: Learn Complementary Features for Image Recognition," The IEEE International Conference an Computer Vision (ICCV), Oct. 2017, pp. 502-510.
Zhang, X., et al., "Adversarial Complementary Learning for Weakly Supervised Object Localization," The IEEE Conference on Computer Vision and Pattern Recognition (CVPR), Apr. 19, 2018, pp. 1325-1334.

* cited by examiner

*Primary Examiner* — Juan A Torres
(74) *Attorney, Agent, or Firm* — Xsensus LLP (57) ABSTRACT

An information processing method includes: inputting sample image into a machine learning architecture to obtain a first feature, and causing a first classifier to calculate a first classification loss; calculating a second feature based on the first feature and a predetermined first mask, and inputting the second feature into the first classifier to calculate an entropy loss; calculating a second mask based on the first mask and the entropy loss to maximize the entropy loss; obtaining an adversarial feature based on the first feature and the second mask, where the adversarial feature is complementary to the second feature; causing, by training the first classifier and the second classifier in association with each other, the second classifier to calculate a second classification loss based on the adversarial feature; and adjusting parameters of the machine learning architecture, the first classifier and the second classifier, to obtain a trained machine learning architecture.

20 Claims, 7 Drawing Sheets

S302 — Input each sample image in a training set into a machine learning architecture to obtain a first feature of the sample image, and cause a first classifier to calculate a first classification loss of the sample image based on the first feature S304 — Calculate a second feature based on the first feature and a predetermined first mask, and input the second feature into the first classifier to calculate entropy loss of class probability distribution S306 — Calculate a second mask based on the first mask and the entropy loss to maximize the entropy loss S308 — Obtain an adversarial feature based on the first feature and the second mask, where the adversarial feature is complementary to the second feature S310 — Train the first classifier and the second classifier in association with each other, and cause the second classifier to calculate a second classification loss of the sample image based on the adversarial feature S312 — Adjust parameters of the machine learning architecture, the first classifier and the second classifier by minimizing a sum of the first classification loss and the second classification loss, to obtain a trained machine learning architecture

INFORMATION PROCESSING APPARATUS AND INFORMATION PROCESSING METHOD

CROSS-REFERENCE TO RELATED APPLICATIONS

This application claims the priority benefit of Chinese Patent Application No. 201910217426.5, filed on Mar. 21, 2019 in the China National Intellectual Property Administration, the disclosure of which is incorporated herein in its entirety by reference.

FIELD

The present disclosure relates to the field of image classification and adversarial learning, and in particular to an information processing apparatus and an information processing method in which two classifiers perform adversarial complementary learning, and an apparatus and method for performing classification with a trained machine learning architecture obtained by the information processing apparatus.

BACKGROUND

In the conventional image classification method, there is only one access. That is, images are directly input to a feature extractor and a classifier, to output a classification result. For example, a training set includes a white cat and a black dog. In a case that the classifier is trained for such data set, the classifier may learn only to distinguish black from white, but ignores features of the cat and the dog. In a case that testing data is a black cat, the classifier may misjudge the testing data as a dog.

SUMMARY

The brief summary of the present disclosure is given in the following, so as to provide basic understanding on certain aspects of the present disclosure. It should be understood that, the summary is not exhaustive summary of the present disclosure. The summary is neither intended to determine key or important parts of the present disclosure, nor intended to limit the scope of the present disclosure. An object of the present disclosure is to provide some concepts in a simplified form, as preamble of the detailed description later.

In view of the above problems, an object of the present disclosure is to provide an information processing apparatus, an information processing method and an apparatus and method for performing classification with a trained machine learning architecture obtained by the information processing apparatus, which can overcome one or more disadvantages of the conventional technology.

According to an aspect of the present disclosure, an information processing apparatus is provided. The apparatus includes: a first classification loss calculating unit configured to input each sample image in a training set into a machine learning architecture to obtain a first feature of the sample image, and to cause a first classifier to calculate a first classification loss of the sample image based on the first feature; an entropy loss calculating unit configured to calculate a second feature based on the first feature and a predetermined first mask, and to input the second feature into the first classifier to calculate an entropy loss of class probability distribution; a mask calculating unit configured to calculate a second mask based on the first mask and the entropy loss to maximize the entropy loss; an adversarial feature obtaining unit configured to obtain an adversarial feature based on the first feature and the second mask, where the adversarial feature is complementary to the second feature; a second classification loss calculating unit configured to cause, by training the first classifier and the second classifier in association with each other, the second classifier to calculate a second classification loss of the sample image based on the adversarial feature; and a training unit configured to adjust, by minimizing a sum of the first classification loss and the second classification loss, parameters of the machine learning architecture, the first classifier and the second classifier, to obtain a trained machine learning architecture.

According to another aspect of the present disclosure, an information processing method is provided. The method includes: a first classification loss calculating step of inputting each sample image in a training set into a machine learning architecture to obtain a first feature of the sample image, and causing a first classifier to calculate a first classification loss of the sample image based on the first feature; an entropy loss calculating step of calculating a second feature based on the first feature and a predetermined first mask, and inputting the second feature into the first classifier to calculate an entropy loss of class probability distribution; a mask calculating step of calculating a second mask based on the first mask and the entropy loss to maximize the entropy loss; an adversarial feature obtaining step of obtaining an adversarial feature based on the first feature and the second mask, where the adversarial feature is complementary to the second feature; a second classification loss calculating step of causing, by training the first classifier and the second classifier in association with each other, the second classifier to calculate a second classification loss of the sample image based on the adversarial feature; and a training step of adjusting, by minimizing a sum of the first classification loss and the second classification loss, parameters of the machine learning architecture, the first classifier and the second classifier, to obtain a trained machine learning architecture.

According to another aspect of the present disclosure, an apparatus for performing classification with the trained machine learning architecture obtained by the information processing apparatus described above is provided. The apparatus includes: a feature extracting unit configured to input an image to be classified into the trained machine learning architecture, to extract a feature of the image to be classified; and a classifying unit configured to calculate feature similarities between the feature of the image to be classified and features of images of known categories, and to classify the image to be classified into a category to which an image of a known category having a largest feature similarity with the image to be classified belongs.

According to other aspects of the present disclosure, a computer program code and a computer program product for implementing the method according to the present disclosure are further provided.

Other aspects of the embodiments of the present disclosure are described in the specification in the following. Preferred embodiments of the present disclosure are described in detail to fully disclose the solutions of the present disclosure, but the preferred embodiments are not intended to limit the present disclosure.

BRIEF DESCRIPTION OF THE DRAWINGS

The present disclosure may be understood better with reference to the detailed description given in conjunction with the drawings in the following. In the drawings, the same or similar components are represented by the same or similar reference numerals. All the drawings together with the detailed illustration below are included in the specification and form a part of the specification, so as to illustrate the preferred embodiments of the present disclosure and explain the principles and advantages of the present disclosure by examples. In the drawings.

DETAILED DESCRIPTION

An exemplary embodiment of the present disclosure will be described hereinafter in conjunction with the drawings. For conciseness and clarity, not all features of an actual embodiment are described in this specification. However, it should be appreciated that numerous implementation-specific decisions shall be made during developing any of such actual implementations so as to achieve specific targets of the developer, for example, to comply with constraining conditions related to system and business, which may change for different implementations. Furthermore, it should also be understood that although the development work may be complicated and time-consuming, for those skilled in the art benefiting from the present disclosure, such development work is only a routine task.

Here, it should further be noted that in order to avoid obscuring the present disclosure due to unnecessary details, only a device structure and/or processing steps closely related to the solution of the present disclosure are illustrated in the drawing, and other details less related to the present disclosure are omitted.

Embodiments of the present disclosure are described in detail in conjunction with drawings hereinafter.

Figure 1:
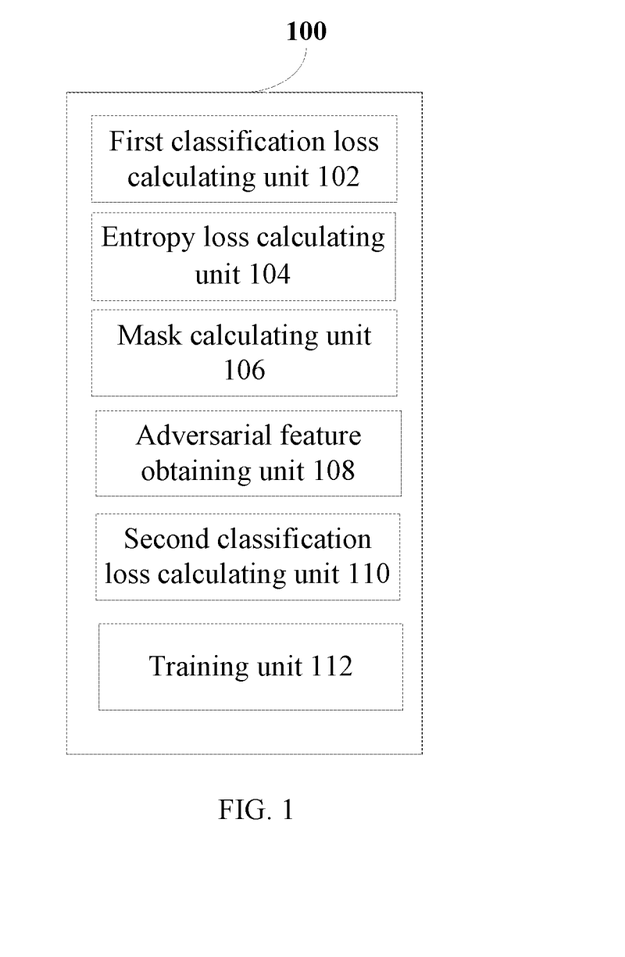
FIG. 1 is a block diagram showing an example of functional configurations of an information processing apparatus according to an embodiment of the present disclosure.

First, a functional block diagram of an information processing apparatus 100 according to an embodiment of the present disclosure is described with reference to FIG. 1. FIG. 1 is a block diagram showing an example of functional configurations of the information processing apparatus 100 according to the embodiment of the present disclosure. As shown in FIG. 1, the information processing apparatus 100 according to the embodiment of the present disclosure includes: a first classification loss calculating unit 102, an entropy loss calculating unit 104, a mask calculating unit 106, an adversarial feature obtaining unit 108, a second classification loss calculating unit 110 and a training unit 112.

For each sample image in a training set, the first classification loss calculating unit 102 may be configured to input the sample image into a machine learning architecture to obtain a first feature of the sample image, and to cause a first classifier to calculate a first classification loss of the sample image based on the first feature.

Exemplary rather than restrictive, the machine learning architecture may be a neural network architecture. It should be understood by those skilled in the art that, the machine learning architecture may he an architecture other than the neural network architecture, which is not described herein. The first feature may be a two-dimensional first feature vector, or may be a three-dimensional first feature map.

Figure 2:
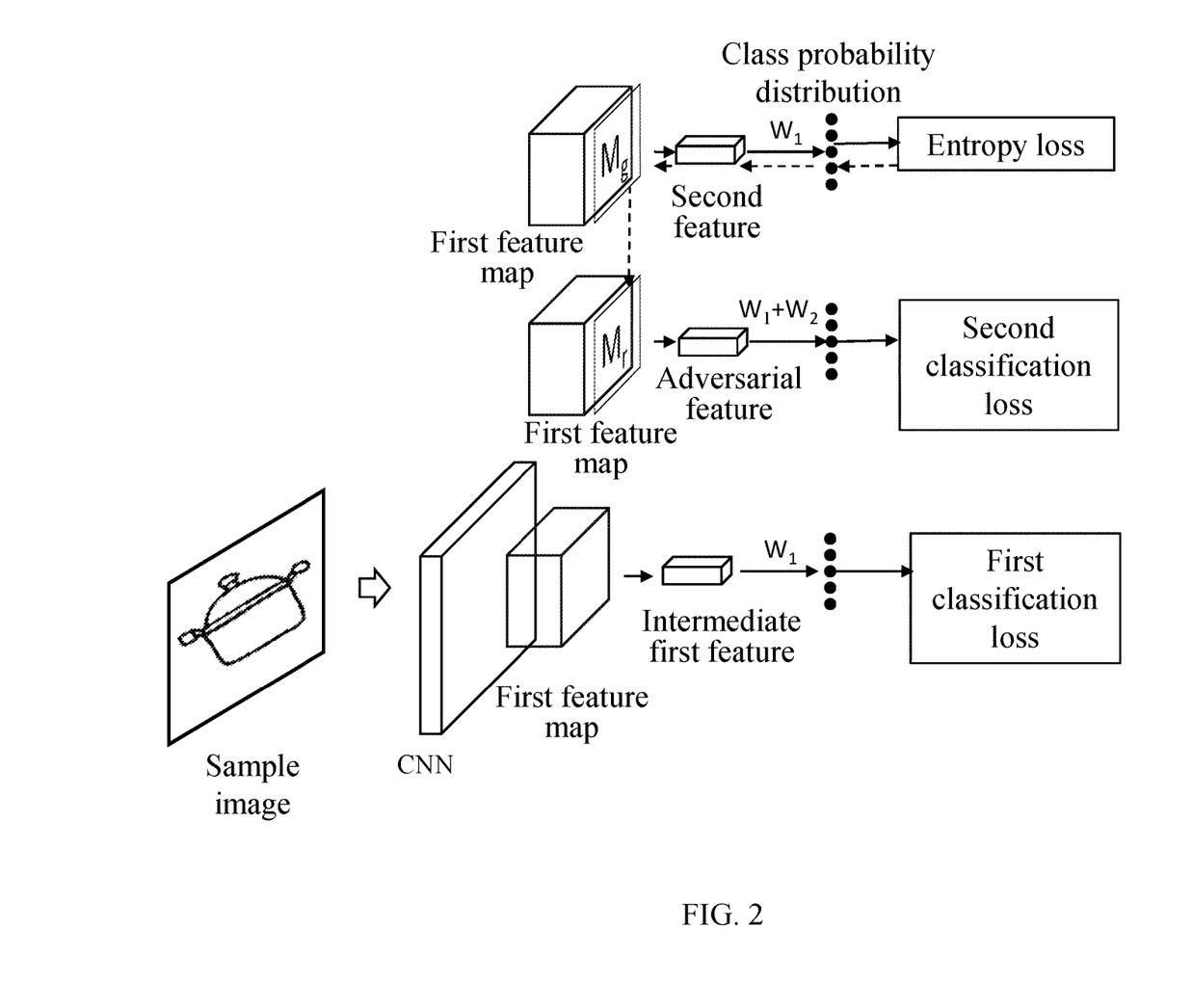
FIG. 2 is a schematic diagram showing a schematic implementation of an information processing apparatus according to an embodiment of the present disclosure.

FIG. 2 is a schematic diagram showing a schematic implementation of the information processing apparatus 100 according to an embodiment of the present disclosure. In FIG. 2, description is made by assuming that the machine learning architecture is a convolutional neural network (CNN) for convenience.

As shown in FIG. 2, a sample image is input into the CNN, to obtain a first feature of the sample image. In FIG. 2, the first feature is shown as a three-dimensional first feature map. For facilitating description, it is assumed that a size of the first feature map is C×K×K, where C represents the number of channels and K represents the length and the width of the feature map. In FIG. 2, a first classifier is indicated by a parameter W1 of the first classifier. In an example, an intermediate first feature vector (indicated as an intermediate first feature in FIG. 2) obtained by processing the first feature map may be input to the first classifier, to calculate a first classification loss L1 of the sample image. In an example, a convolutional operation may be performed on the first feature map to obtain the first feature vector, or a sum operation may be performed on the first feature map in a spatial domain and then the sum is averaged to obtain the intermediate first feature vector. Those skilled in the art may conceive other manners for obtaining the intermediate first feature vector from the first feature map, which are not described herein.

In an example, the first classification loss of the sample image may be calculated according to the softmax loss function. In addition, those skilled in the art may conceive other manners for calculating the first classification loss of the sample image, which are not described herein.

The entropy loss calculating unit 104 may be configured to calculate a second feature based on the first feature and a predetermined first mask, and input the second feature into the first classifier W1 to calculate entropy loss of class probability distribution. Since the second feature is obtained from the first feature, the second feature is associated with the first feature. In a case that the first feature is a three-dimensional first feature map, the three-dimensional first feature map is converted into a vector by utilizing the predetermined first mask to obtain the second feature.

In FIG. 2, the predetermined first mask is indicated by $M_g$. In an example, a value of each position in the $M_g$ may be set as $1/(K \times K)$. Since values of all positions in the $M_g$ are equal, the first mask $M_g$ may be referred to as a global pooling mask. In a case that the first mask $M_g$ is the global pooling mask, an average vector which is obtained by performing a sum operation on the three-dimensional first feature map in the spatial domain and then averaging the sum serves as the second feature. Those skilled in the art may conceive other manners for setting values of the first mask, which are not described herein.

Preferably, the entropy loss calculating unit 104 may be configured to average features obtained by multiplying the first feature with the first mask, to obtain the second feature.

In an example, the entropy loss calculating unit 104 may average the features obtained by multiplying the first feature map with the first mask $M_g$ in the spatial domain, to obtain the second feature.

Those skilled in the art may conceive other manners for calculating the second feature based on the first feature and the predetermined first mask, which are not described herein.

As shown by a first row at the top of FIG. 2, the second feature is input into the first classifier $W_1$ to calculate class probability distribution, and entropy loss $L_{ent}$ is calculated based on the class probability distribution. The method for calculating the entropy loss is well known for those skilled in the art, which is not described herein. In the present disclosure, a classification determination degree of the first classifier is defined by using the entropy loss. The greater entropy loss indicates a low classification determination degree of the first classifier, and the smaller entropy loss indicates a high classification determination degree of the first classifier.

In the present disclosure, the following adversarial feature is to be searched for. The adversarial feature is complementary to the second feature (since the second feature is associated with the first feature, the adversarial feature is also complementary to the first feature), and the classification performed based on the adversarial feature and the second feature can achieve a higher classification accuracy. In order to locate the adversarial feature, the entropy loss of the first classifier which learns with the first feature should be controlled to be as great as possible (that is, the classification determination degree of the first classifier should be controlled to be as low as possible).

For example, a training, set includes a white cat and a black dog. In the conventional technology, if the first classifier is trained for such data set and it is assumed that the first feature is a feature related to color information (since the second feature is associated with the first feature, the second feature is also a feature related to color information), the first classifier may just learn to distinguish black from white, but ignores features of shapes of the cat and the dog. In a case that testing data is a black cat, the first classifier may misjudge the testing data as a dog.

In the present disclosure, a feature (that is, the adversarial feature) reflecting shapes of the cat and the dog is required to be searched for. The adversarial feature may be located by controlling the classification determination degree of the first classifier which learns based on the feature related to color information to be as low as possible. In the present disclosure, in a case that the testing data is a black cat, the testing data may be determined as the cat based on the feature related to the color information in combination with the features reflecting the shapes of the cat and the dog, thereby improving the classification accuracy.

In the present disclosure, the adversarial feature is located based on the first feature map by utilizing a second mask described below.

The mask calculating unit 106 may be configured to calculate the second mask based on the first feature and the entropy loss, to maximize the entropy loss.

As shown by arrows towards left at a first row in FIG. 2, the calculated entropy loss $l_{ent}$ is propagated reversely. The mask calculating unit 106 may be configured to calculate the second mask $M_r$ based on the first mask $M_g$ and the entropy loss $l_{ent}$, to maximize the entropy loss of the first classifier which learns based on the first feature. Maximization of the entropy loss is equivalent to maximize the first classification loss, that is, decreasing the classification determination degree of the first classifier as much as possible.

Preferably, the mask calculating unit 106 may be configured to calculate the second mask based on a gradient of the entropy loss with respect to the first mask. If the gradient is positive, the entropy loss is increased. If the gradient is negative, the entropy loss is decreased.

The gradient of the entropy loss function with respect to the first mask $M_g$ is obtained by reverse propagation, and a value of the first mask $M_g$ is updated by maximizing the entropy loss of the first classifier, to obtain the second mask $M_r$. The second mask $M_r$ may be referred to as an adversarial attention mask, which indicates an affecting degree of the feature of the mask at each position on increasing of uncertainty of the first classifier.

In an example, the second mask Mr may be calculated according to the following equation (1):

$$M_r = M_g + s * \frac{\partial l_{ent}}{\partial M_g} \qquad (1)$$

In the equation (1), $$\frac{\partial l_{ent}}{\partial M_g}$$

represents a gradient of the entropy loss function $l_{ent}$ with respect to the first mask $M_g$, and s represents an updating step size. A value of s may be set according to experience by those skilled in the art. For example, s may be set as 0.1.

The mask $M_r$ may be calculated according to Long Short-Term Memory model (LSTM). Specifically, the first mask $M_g$ is input to the LSTM and the LSTM outputs the second mask $M_r$ and the entropy loss $l_{ent}$. The LSTM is utilized to obtain the second mask $M_r$ with the object of maximizing the entropy loss.

Those skilled in the art may conceive other manners for calculating the second mask based on the first mask and the entropy loss, which are not described herein.

The adversarial feature obtaining unit 108 may be configured to obtain adversarial features based on the first feature and the second mask. The adversarial feature is complementary to the second feature.

As shown by a second row at the middle of FIG. 2, the adversarial feature is obtained based on the first feature map and the second mask $M_r$.

Preferably, the adversarial feature obtaining unit 108 may be configured to average features obtained after multiplying the first feature with the second mask, to obtain the adversarial feature.

A sum operation is performed on the features obtained after multiplying the first feature map with the second mask $M_r$ in a spatial domain and then the sum is averaged, to obtain the adversarial feature.

The adversarial feature is complementary to the second feature. Since the first feature is associated with the second feature, the adversarial feature is also complementary to the first feature. That is, the first feature and the adversarial feature are complementary discrimination features, and the second feature and the adversarial feature are also complementary discrimination features. It follows that, the information processing apparatus 100 according to the embodiment of the present disclosure may learn and extract these complementary discrimination features. The complementary discrimination features can better represent the overall features of the image, rather than represent only the local features of the image.

The second classification loss calculating unit 110 may be configured to cause, by training the first classifier and the second classifier in association with each other, the second classifier to calculate a second classification loss of the sample image based on the adversarial feature.

Preferably, the process of training the first classifier and the second classifier in association with each other includes: causing a parameter of the second classifier to include a parameter of the first classifier, and causing the second classifier to calculate the second classification loss of the sample image based only on the adversarial feature. FIG. 2 shows a case that the parameter of the second classifier includes the parameter of the first classifier. That is, the parameter of the second classifier is $W_1+W_2$. In addition, the second classifier is represented by $W_1+W_2$ in FIG. 2 for convenience.

Alternatively, the process of training the first classifier and the second classifier in association with each other includes: causing the parameter of the second classifier not to include the parameter of the first classifier, and causing the second classifier to calculate the second classification loss of the sample image based on both the second feature and the adversarial feature. If the parameter of the second classifier does not include the parameter of the first classifier, the parameter of the second classifier may be represented by only $W_2$.

In an example, the second classification loss of the sample image may be calculated by adopting the softmax loss function. In addition, those skilled in the art may conceive other manners for calculating the second classification loss of the sample image, which are not described herein.

The training unit 112 may be configured to adjust parameters of the machine learning architecture, the first classifier and the second classifier by minimizing a sum of the first classification loss and the second classification loss, thereby obtaining a trained machine learning architecture.

In an embodiment, the training unit 112 performs reverse propagation in an iteration mode to update the parameters of the machine learning architecture, the first classifier and the second classifier, by minimizing the sum of the first classification loss and the second classification loss. The iteration ends in a case of meeting the condition, thereby obtaining the trained machine learning architecture, first classifier and second classifier.

In the conventional image classification method, there is only one access. That is, images are directly input to the feature extractor and the classifier, to output a classification result. This method may result in that the classifier focuses on simple regions for classification excessively but ignores features of other regions. For example, a training set includes a white cat and a black dog. In a case that the classifier is trained for such data set, the classifier may learn only to distinguish black from white, but ignores features of the cat and the dog. In a case that testing data is a black cat, the classifier may misjudge the testing data as the dog. Therefore, the classifier learns only to distinguishing categories based on colors, but ignores other potential features of each category. In the information processing apparatus 100 according to the embodiment of the present disclosure, two classifiers perform adversarial complementary learning to solve the above problem in the conventional image classification method. In the information processing apparatus 100 according to the embodiment of the present disclosure, complementary discrimination features (for example, the feature related to color information and features reflecting shapes of the cat and the dog in the above examples) are learned automatically. The complementary discrimination features can better represent overall features of the image rather than represent only the local features of the image. The first classifier and the second classifier are trained in association with each other based on the complementary discrimination features, to obtain the trained machine learning architecture, thereby improving the classification accuracy.

Corresponding to the embodiments of the apparatus for training a classification model described above, embodiments of a method for training a classification model are further provided according to the present disclosure hereinafter.

Figure 3:
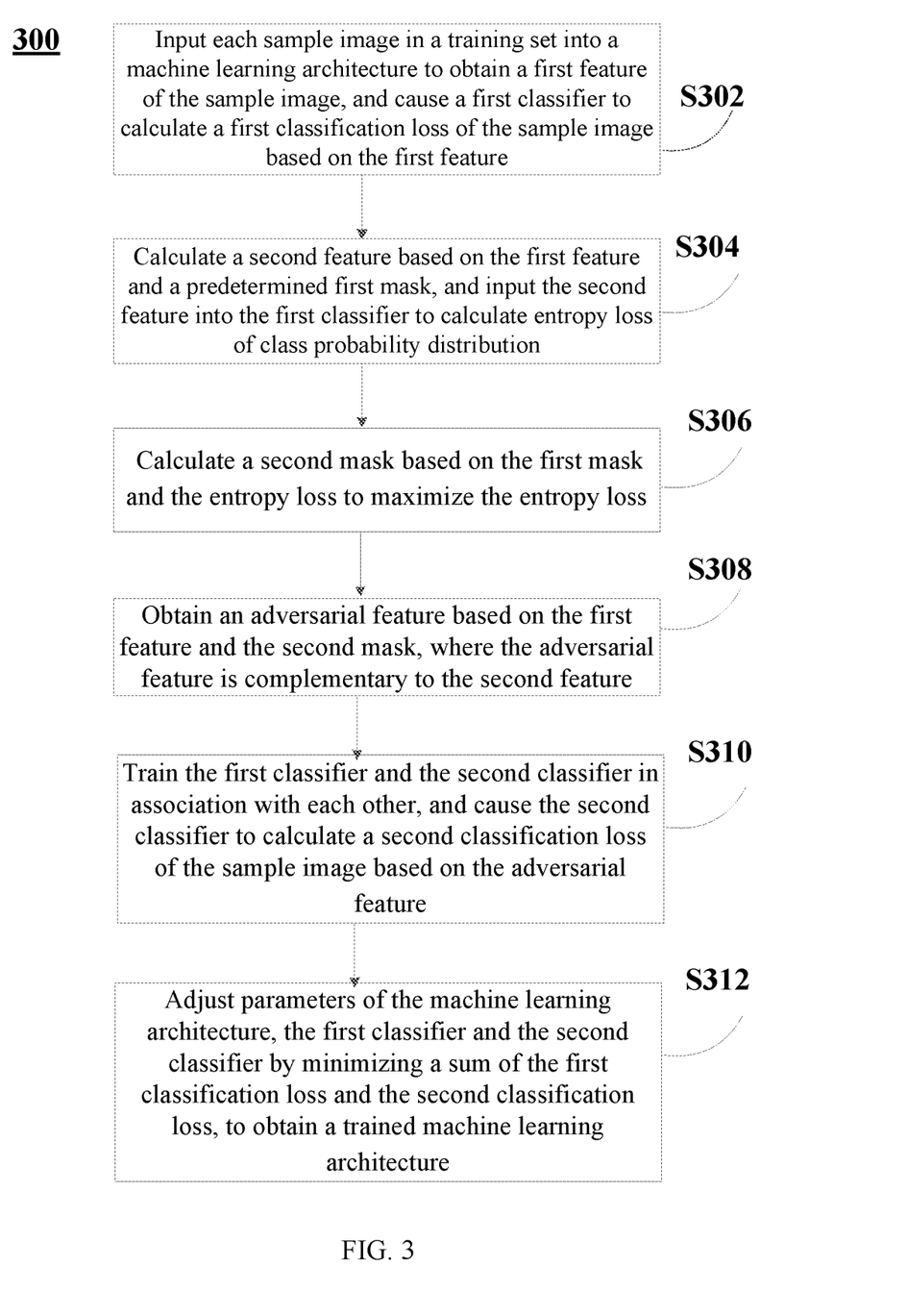
FIG. 3 is a flowchart of a flow example of an information processing method according to an embodiment of the present disclosure.

FIG. 3 is a flowchart showing a flow example of an information processing method 300 according to an embodiment of the present disclosure.

As shown in FIG. 3, the information processing method 300 according to the embodiment of the present disclosure includes: a first classification loss calculating step S302, an entropy loss calculating step S304, a mask calculating step S306, an adversarial feature obtaining step S308, a second classification loss calculating step S310 and a training step S312.

In the first classification loss calculating step S302, for each sample image in a training set, the sample image is input to a machine learning architecture to obtain a first feature of the sample image, and a first classifier is caused to calculate a first classification loss of the sample image based on the first feature.

Exemplary rather than restrictive, the machine learning architecture may be a neural network architecture. Those skilled in the may understand that the machine learning architecture may be an architecture other than the neural network architecture, which is not described herein. The first feature may be a two-dimensional first feature vector, or may be a three-dimensional first feature map.

In an example, the first classification loss of the sample image may be calculated by adopting the softmax loss function. In addition, those skilled in the art may conceive other manners for calculating the first classification loss of the sample image, which are not described herein.

In the entropy loss calculating step S304, a second feature may be calculated based on the first feature and a predetermined first mask, and the second feature is input to the first classifier to calculate an entropy loss of class probability distribution. Since the second feature is obtained from the first feature, the second feature is associated with the first feature.

For the setting of the value of the first mask, one may refer to the description of the apparatus embodiment with reference to FIG. 2, and the details are not repeated herein.

Preferably, in the entropy loss calculating step S304, features obtained by multiplying the first feature with the first mask are averaged, to obtain a second feature.

In an example, in the entropy loss calculating step S304, the features obtained after multiplying the first feature map with the first mask $M_g$ may be averaged in a spatial domain, to obtain the second feature.

Those skilled in the art may conceive other manners for calculating the second feature based on the first feature and the predetermined first mask, which are not described herein.

The second feature is input to the first classifier to calculate the class probability distribution, and the entropy loss is calculated based on the class probability distribution. In the present disclosure, a classification determination degree of the first classifier is defined by the entropy loss. A greater entropy loss indicates a low classification determination degree of the first classifier, and a smaller entropy loss indicates a high classification determination degree of the first classifier.

In the mask calculating step S306, a second mask may be calculated based on the first mask and the entropy loss to maximize the entropy loss.

Preferably, in the mask calculating step S306, the second mask may be calculated based on a gradient of the entropy loss with respect to the first mask. If the gradient is positive, the entropy loss is increased. If the gradient is negative, the entropy loss is decreased.

The gradient of the entropy loss function with respect to the first mask is obtained by reverse propagation, and a value of the first mask is updated by maximizing the entropy loss of the first classifier, thereby obtaining the second mask.

For examples of calculating the second mask based on the gradient of the entropy loss with respect to the first mask, one may refer to the description about the equation (1) in the apparatus embodiments, and the details are not repeated herein.

The second mask may be calculated according to Long Short-Term Memory model (LSTM). Specifically, the first mask is input to the LSTM, and the LSTM outputs the second mask and the entropy loss. That is, the LSTM is utilized to obtain the second mask with the object of maximizing the entropy loss.

Those skilled in the art may conceive other manners for calculating the second mask based on the first mask and the entropy loss, which are not described herein.

In the adversarial feature obtaining step S308, the adversarial feature may be obtained based on the first feature and the second mask. The adversarial feature is complementary to the second feature.

Preferably, in the adversarial feature obtaining step S308, the features obtained after multiplying the first feature with the second mask are averaged, to obtain the adversarial feature.

A sum operation is performed on the features obtained after multiplying the first feature map with the second mask in a spatial domain and then the sum is averaged, to obtain the adversarial feature.

The adversarial feature is complementary to the second feature. Since the first feature is associated with the second feature, the adversarial feature is also complementary to the first feature. That is, the first feature and the adversarial feature are complementary discrimination features, and the second feature and the adversarial feature are also complementary discrimination features. It follows that, with the information processing method 300 according to the embodiment of the present disclosure, these complementary discrimination features may be extracted automatically. The complementary discrimination features can better represent the overall features of the image, rather than represent only the local features of the image.

In the second classification loss calculating step S310, by training the first classifier and the second classifier in association with each other, the second classifier may be caused to calculate a second classification loss of the sample image based on the adversarial feature.

Preferably, the process of training the first classifier and the second classifier in association with each other includes: causing a parameter of the second classifier to include a parameter of the first classifier, and causing the second classifier to calculate the second classification loss of the sample image based only on the adversarial feature.

Alternatively, the process of training the first classifier and the second classifier in association with each other includes: causing the parameter of the second classifier not to include the parameter of the first classifier, and causing the second classifier to calculate the second classification loss of the sample image based on both the second feature and the adversarial feature.

In an example, the second classification loss of the sample image may be calculated by adopting the softmax loss function. In addition, those skilled in the art may conceive other manners for calculating the second classification loss of the sample image, which are not described herein.

In the training step S312, parameters of the machine learning architecture, the first classifier and the second classifier may be adjusted by minimizing a sum of the first classification loss and the second classification loss, thereby obtaining a trained machine learning architecture.

In an embodiment, in the training step S312, reverse propagation is performed in an iteration mode to update the parameters of the machine learning architecture, the first classifier and the second classifier, by minimizing the sum of the first classification loss and the second classification loss. The iteration ends in a case of meeting the condition, thereby obtaining the trained machine learning architecture, first classifier and second classifier.

In summary, with the information processing method 300 according to the embodiment of the present disclosure, two classifiers perform adversarial complementary learning to solve the problems existing in the conventional image classification method. In the information processing method 300 according to the embodiment of the present disclosure, the complementary discrimination features are learned automatically. The complementary discrimination features can better represent the overall features of the image rather than represent only the local features of the image. The first classifier and the second classifier are trained in association with each other based on the complementary discrimination features, to obtain the trained machine learning architecture, thereby improving the classification accuracy.

Figure 4:
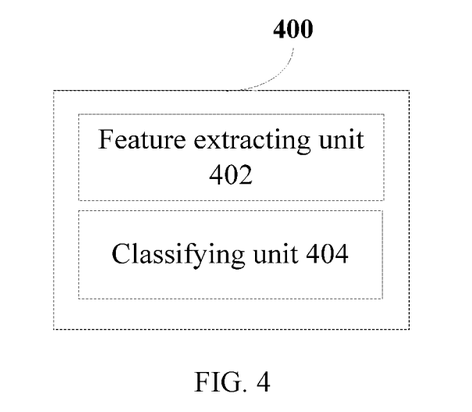
FIG. 4 is a block diagram showing an example of functional configurations of an apparatus for performing classification according to an embodiment of the present disclosure.

An apparatus 400 for performing classification with the trained machine learning architecture obtained by the above information processing apparatus 100 is further provided according to the present disclosure. FIG. 4 is a block diagram showing an example of functional configurations of an apparatus 400 for performing classification according to an embodiment of the present disclosure. As shown in FIG. 4, the apparatus 400 for performing classification according to the embodiment of the present disclosure includes a feature extracting unit 402 and a classifying unit 404.

The feature extracting unit 402 may be configured to input an image to be classified into the trained machine learning architecture, to extract features of the object to be extracted.

Preferably, the feature extracting unit 402 is configured to input an image of a known category into the trained machine learning architecture, to extract features of the image of the known category. Alternatively, the features of the image of the known category may be extracted by other manners known in the art.

The extracted feature may be a two-dimensional feature vector, or may be a three-dimensional feature map.

As described above, the information processing apparatus 100 may automatically learn the complementary discrimination features, and the complementary discrimination features can better represent the overall features of the image. Therefore, the complementary discrimination features of the image to be classified may be extracted with the trained machine learning architecture obtained by the information processing apparatus 100. The complementary discrimination features can better represent the overall features of the image to be classified rather than represent only the local features of the image to be classified. Further, the image to be classified is classified based on the complementary discrimination features, thereby improving the classification accuracy.

The classifying unit 404 may be configured to calculate feature similarities between the feature of the image to be classified and features of image of known categories, and to classify the image to be classified into a category to which an image of a known category having a largest feature similarity with the image to be classified belongs.

Figure 5:
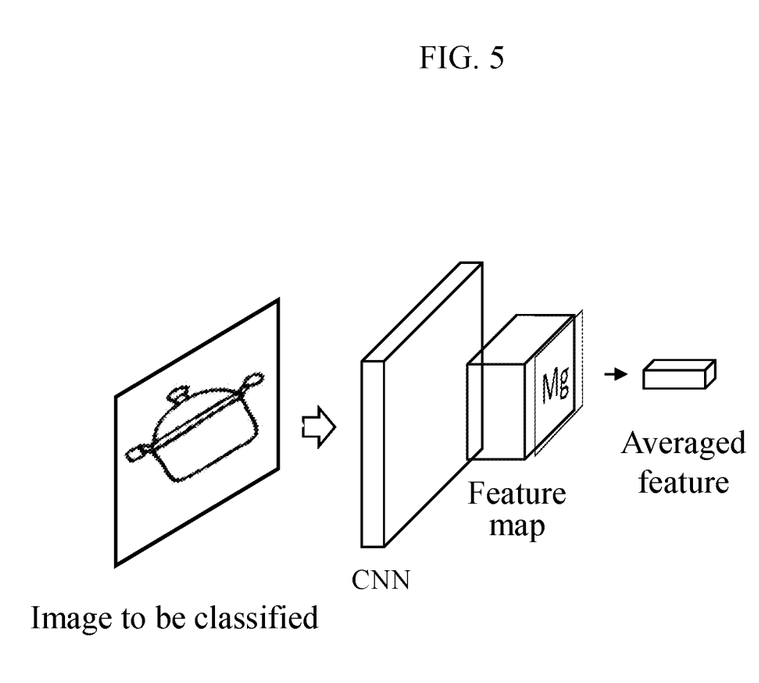
FIG. 5 is a schematic diagram showing a schematic implementation of an apparatus for performing classification according to an embodiment of the present disclosure.

FIG. 5 is a schematic diagram showing a schematic implementation of an apparatus 400 for performing classification according to an embodiment of the present disclosure. In FIG. 5, description is made by assuming that the trained machine learning architecture is a convolutional neural network (CNN) for convenience.

As shown in FIG. 5, an image to be classified is input to the trained CNN, to extract features of the image to be classified. In FIG. 5, the extracted feature is shown as a three-dimensional feature map. It is assumed that a size of the first feature map is C×K×K. In which, C represents the number of channels, and K represents the length and the width of the feature map. As described above, the feature map includes complementary discrimination features of the image to be classified. The complementary discrimination features can better represent overall features of the image to be classified rather than represent only the local features of the image to be classified.

Preferably, the classifying unit 404 may be configured to average features of the image to be classified, and calculate a feature similarity based on the averaged feature.

In an example, as shown in FIG. 5, the extracted feature map is multiplied with a first mask $M_g$ of which a value of each position is 1/(K×K), and the features obtained after multiplying are averaged. That is, global averaging pooling is performed on the extracted feature map, to obtain the averaged feature vector (in FIG. 5, the averaged feature vector is indicated as the averaged feature). The feature similarity is calculated based on the averaged feature vector.

Preferably, the classifying unit 404 may be configured to calculate a cosine distance between features of the image to be classified and features of images of known categories as the feature similarity, and classify the image to be classified into a category to which an image of a known image having a shortest distance from the image to be classified belongs.

In an example, cosine distances between the averaged feature vector of the image to be classified and averaged feature vectors of images of known categories are calculated, and a category to which the image to classified belongs is predicted according to the shortest distance among the calculated cosine distances.

In addition to the cosine distance, those skilled in the art may conceive other measurement manners serving as the feature similarity, which are not described herein.

In summary, in the apparatus 400 for performing classification according to the embodiment of the present disclosure, the complementary discrimination features of the image to be classified may be extracted with the trained machine learning architecture obtained by the information processing apparatus 100. The complementary discrimination features can better represent the overall features of the image to be classified rather than represent only the local features of the image to be classified. Further, the image to be classified is classified based on the complementary discrimination features, thereby obtaining the classification accuracy.

Figure 6:
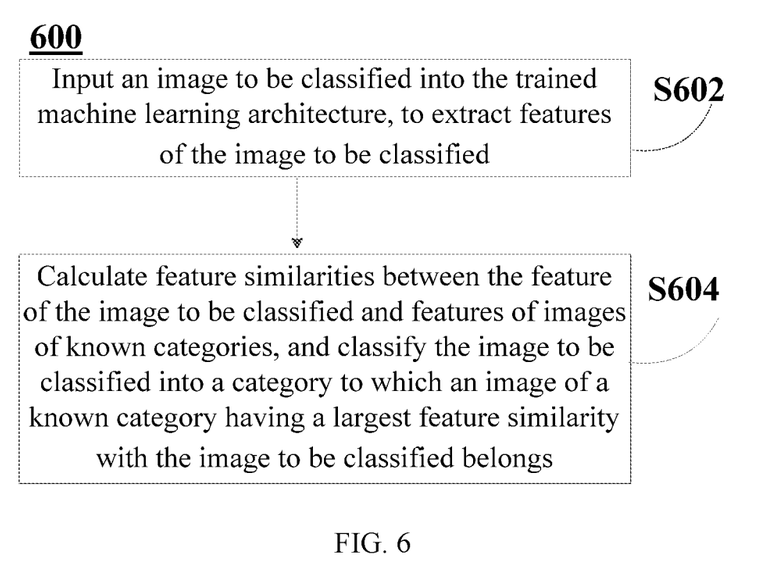
FIG. 6 is a flowchart showing a flow example of a method for performing classification according to an embodiment of the present disclosure.

Corresponding to the embodiment of apparatus for performing classification, an embodiment of a method for performing classification with the trained machine learning architecture obtained by the information processing apparatus is further provided according to the present disclosure. FIG. 6 is a flowchart showing a flow example of a method 600 for performing classification according to an embodiment of the present disclosure. As shown in FIG. 6, the method 600 for performing classification according to the embodiment of the present disclosure includes a feature extraction step S602 and a classification step S604.

In the feature extraction step S602, an image to be classified may be input to the trained machine learning architecture, to extract features of the image to be classified.

Preferably, in the feature extraction step S602, an image of a known category is input into the trained machine learning architecture, to extract features of the image of the known category. Alternatively, the features of the image of the known category may be extracted by other manners known in the art.

The extracted feature may be a two-dimensional feature vector, or may be a three-dimensional feature map.

As described above, the information processing apparatus 100 may learn the complementary discrimination features automatically, and the complementary discrimination features can better represent overall features of the image. Therefore, the complementary discrimination features of the image to be classified may be extracted with the trained machine learning architecture obtained by the information processing apparatus 100. The complementary discrimination features can better represent the overall features of the image to be classified rather than represent only the local features of the image to be classified. Further, the image to be classified is classified based on the complementary discrimination features, thereby improving the classification accuracy.

In the classification step S604, feature similarities between the feature of the image to be classified and features of images of known categories may be calculated, and the image to be classified is classified into a category to which an image of a known category having the largest feature similarity with the image to be classified belongs.

Preferably, in the classification step S604, features of the image to be classified are averaged, and the feature similarity is calculated based on the averaged feature.

Preferably, in the classification step S604, cosine distances between the feature of the image to be classified and features of images of known categories may be calculated as feature similarities, and the image to be classified is classified into a category to which an image of a known category having the shortest cosine distance from the image to be classified belongs.

In an example, cosine distances between the averaged feature vector of the image to be classified and averaged feature vectors of images of known categories are calculated, and the category to which the image to be classified belongs is predicted according to the shortest distance among the calculated cosine distances.

In addition to the cosine distance, those skilled in the art may conceive other measurement manners serving as the feature similarity, which are not described herein.

In summary, with the method 600 for performing classification according to the embodiment of the present disclosure, the complementary discrimination features of the image to be classified may be extracted with the trained machine learning architecture obtained by the information processing apparatus 100. The complementary discrimination features can better represent the overall features of the image to be classified rather than represent only the local features of the image to be classified. Further, the image to be classified is classified based on the complementary discrimination features, thereby improving the classification accuracy.

It should be noted that, although functional configurations and operations of the information processing apparatus and method, and the apparatus and method for performing classification according to the embodiments of the present disclosure are described above, the above description is only schematic rather than restrictive. Those skilled in the art may modify the above embodiments according to the principles of the present disclosure, for example, adding, deleting or combining the functional modules and operations in the embodiments, and such modification falls within the scope of the present disclosure.

In addition, it should be noted that, the method embodiments correspond to the apparatus embodiments, and for the content not described in detail in the method embodiments, one may refer to corresponding description in the apparatus embodiments. The details are not repeated herein.

In addition, a storage medium and a program product are further provided according to the present disclosure. Machine executable instructions in the storage medium and the program product according to the embodiment of the present disclosure may be executed to perform the information processing method described above. For the content not described in detail here, one may refer to the corresponding description above, and the details are not repeated here.

Accordingly, the storage medium for carrying the program product including the machine executable instruction is further included in the present disclosure. The storage medium includes but not limited to a software disk, an optical disk, a magnetic-optical disk, a storage card, and a storage stick and so on.

In addition, it should be noted that the series of processing and the apparatus may be implemented by software and/or firmware. In a case of implementing the present disclosure by software and/or firmware, programs constituting the software are installed to a computer with a dedicated hardware structure (such as a general-purpose personal computer 700 shown in FIG. 7) from the storage medium or the network. When being installed with various types of programs, the computer can perform various functions.

Figure 7:
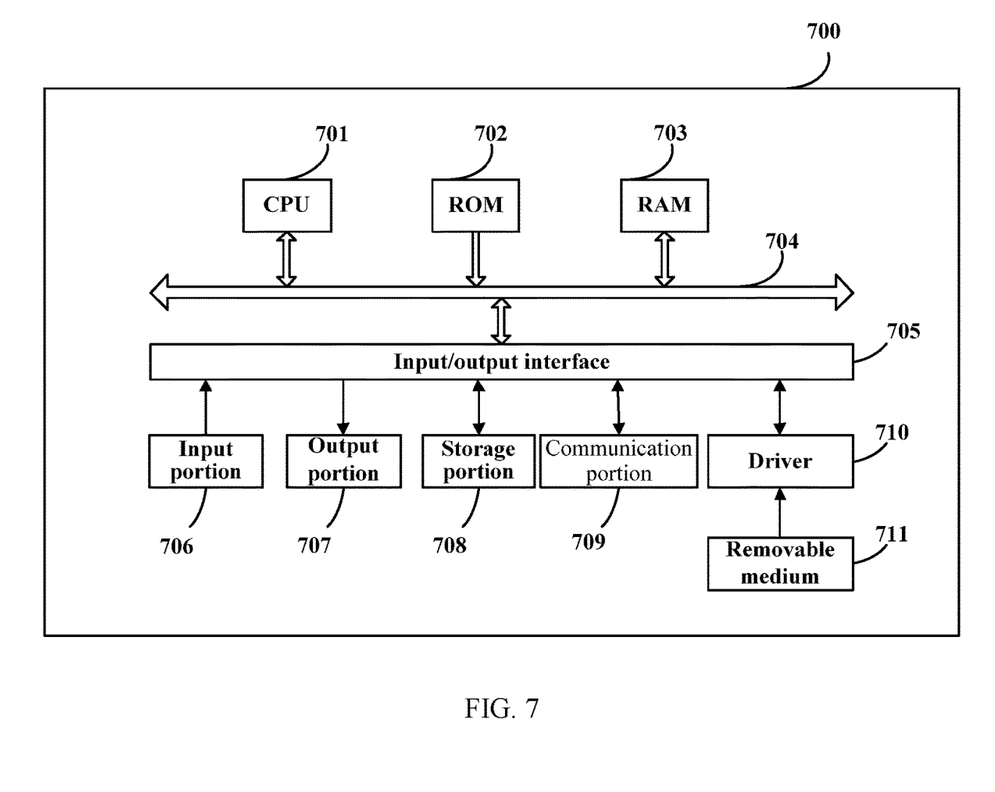
FIG. 7 is a block diagram of a schematic structure of a personal computer which may be adopted in the embodiment of the present disclosure.

In FIG. 7, a central processing unit (CPU) 701 performs various processing based on programs stored in a read only memory (ROM) 702 or programs loaded to a random access memory (RAM) 703 from a storage portion 708. In the RAM 703, data required when the CPU 701 performs various processing is stored as needed.

The CPU 701, the ROM 702 and the RAM 703 are connected to each other via a bus 704. An input/output interface 705 is also connected to the bus 704.

The following components are connected to the input/output interface 705: an input portion 706 including a keyboard, a mouse and the like, an output portion 707 including a display such as a Cathode Ray Tube (CRT) and a Liquid Crystal Display (LCD), a loudspeaker and the like, the storage portion 708 including a hard disk and the like, and a communication portion 709 including a network interface card such as a LAN card, a modem and the like. The communication portion 709 performs communication processing via a network such as the Internet.

If necessary, a driver 710 can also be connected to the input/output interface 705. A removable medium 711 such as a magnetic disk, an optical disk, a magneto-optical disk, a semiconductor memory and the like is mounted on the driver 710 as necessary such that a computer program read out therefrom is installed in the storage portion 708.

In a case that the series of processing above is implemented by software, a program constituting the software is installed from the network such as the Internet or the storage medium such as the removable medium 711.

It is understood by those skilled in the art that the storage medium is not limited to the removable medium 711 shown in FIG. 7 in which the program is stored and which is distributed separately from the device so as to provide the program to the user. Examples of the removable medium 711 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 702, the hard disk contained in the storage portion 708 or the like. Herein, the program is stored in the storage medium, and the storage medium is distributed to the user together with the device containing the storage medium.

Preferred embodiments of the present disclosure are described above with reference to the drawings, but the present disclosure is not limited by the preferred embodiments. Those skilled in the art may make various alternations and modifications within the scope of the attached claims, and it should be understood that these alternations and modifications naturally fall within the technical scope of the present disclosure.

For example, multiple functions of one unit in the above embodiments may be achieved by separate devices. Alternatively, multiple functions implemented by multiple units in the above embodiments may be implemented by separate devices. In addition, one of the above functions may be implemented by multiple units. Certainly, such configuration is included in the technical scope of the present disclosure.

In the specification, steps described in the flowchart include not only the processing performed in the described order and in a time order, but also include processing performed in parallel or independently which is unnecessary to be performed in the time order. In addition, for steps processed in the time order, the order may be changed certainly.

In addition, the following configurations are provided according to the technology of the present disclosure.

Item 1. An information processing apparatus, comprising:
a first classification loss calculating unit configured to input each sample image in a training set into a machine learning architecture to obtain a first feature of the sample image, and to cause a first classifier to calculate a first classification loss of the sample image based on the first feature;

an entropy loss calculating unit configured to calculate a second feature based on the first feature and a predetermined first mask, and to input the second feature into the first classifier to calculate an entropy loss of class probability distribution;

a mask calculating unit configured to calculate a second mask based on the first mask and the entropy loss to maximize the entropy loss;

an adversarial feature obtaining unit configured to obtain an adversarial feature based on the first feature and the second mask, wherein the adversarial feature is complementary to the second feature;

a second classification loss calculating unit configured to cause, by training the first classifier and the second classifier in association with each other, the second classifier to calculate a second classification loss of the sample image based on the adversarial feature; and a training unit configured to adjust, by minimizing a sum of the first classification loss and the second classification loss, parameters of the machine learning architecture, the first classifier and the second classifier, to obtain a trained machine learning architecture.

Item 2. The information processing apparatus according to Item 1, wherein the mask calculating unit is configured to calculate the second mask based on a gradient of the entropy loss with respect to the first mask.

Item 3. The information processing apparatus according to Item 1, wherein the mask calculating unit is configured to calculate, with a Long Short-Term Memory Model (LSTM), the second mask based on the entropy loss and the first mask.

Item 4. The information processing apparatus according to Item 1, wherein the training the first classifier and the second classifier in association with each other comprises: causing parameters of the second classifier to comprise parameters of the first classifier, and causing the second classifier to calculate the second classification loss of the sample image based only on the adversarial feature.

Item 5. The information processing apparatus according to Item 1, wherein the training the first classifier and the second classifier in association with each other comprises: causing parameters of the second classifier not to comprise parameters of the first classifier, and causing the second classifier to calculate the second classification loss of the sample image based on both the second feature and the adversarial feature.

Item 6. The information processing apparatus according to Item 1, wherein the adversarial feature obtaining unit is configured to average features obtained after multiplying the first feature with the second mask, to obtain the adversarial feature.

Item 7. The information processing apparatus according to Item 1, wherein the entropy loss calculating unit is configured to average features obtained after multiplying the first feature with the first mask, to obtain the second feature.

Item 8. The information processing apparatus according to Item 1, wherein the first feature is a three-dimensional feature.

Item 9. The information processing apparatus according to Item 1, wherein the machine learning architecture is a neural network architecture.

Item 10. An information processing method, comprising:

a first classification loss calculating step of inputting each sample image in a training set into a machine learning architecture to obtain a first feature of the sample image, and causing a first classifier to calculate a first classification loss of the sample image based on the first feature;

an entropy loss calculating step of calculating a second feature based on the first feature and a predetermined first mask, and inputting the second feature into the first classifier to calculate an entropy loss of class probability distribution;

a mask calculating step of calculating a second mask based on the first mask and the entropy loss to maximize the entropy loss;

an adversarial feature obtaining step of obtaining an adversarial feature based on the first feature and the second mask, wherein the adversarial feature is complementary to the second feature;

a second classification loss calculating step of causing, by training the first classifier and the second classifier in association with each other, the second classifier to calculate a second classification loss of the sample image based on the adversarial feature; and a training step of adjusting, by minimizing a sum of the first classification loss and the second classification loss, parameters of the machine learning architecture, the first classifier and the second classifier, to obtain a trained machine learning architecture.

Item 11. The information processing method according to Item 10, wherein in the mask calculating step, the second mask is calculated based on a gradient of the entropy loss with respect to the first mask.

Item 12. The information processing method according to Item 10, wherein in the mask calculating steps, the second mask is calculated based on the entropy loss and the first mask with a Long Short-Term Memory Model (LSTM).

Item 13. The information processing method according to Item 10, wherein the training the first classifier and the second classifier in association with each other comprises: causing parameters of the second classifier to comprise parameters of the first classifier, and causing the second classifier to calculate the second classification loss of the sample image based only on the adversarial feature.

Item 14. The information processing method according to Item 10, wherein the training the first classifier and the second classifier in association with each other comprises: causing parameters of the second classifier not to comprise parameters of the first classifier, and causing the second classifier to calculate the second classification loss of the sample image based on both the second feature and the adversarial feature.

Item 15. The information processing method according to Item 10, wherein in the adversarial feature obtaining step, features obtained after multiplying the first feature with the second mask are averaged, to obtain the adversarial feature.

Item 16. The information processing method according to Item 10, wherein in the entropy loss calculating step, features obtained after multiplying the first feature with the first mask are averaged, to obtain the second feature.

Item 17. The information processing method according to Item 10, wherein the first feature is a three-dimensional feature.

Item 18. The information processing method according to Item 10, wherein the machine learning architecture is a neural network architecture.

Item 19. An apparatus for performing classification with the trained machine learning architecture obtained by the information processing apparatus according to any one of Items 1 to 9, comprising:

a feature extracting unit configured to input an image to be classified into the trained machine learning architecture, to extract a feature of the image to be classified; and a classifying unit configured to calculate feature similarities between the feature of the image to be classified and features of images of known categories, and to classify the image to be classified into a category to which an image of a known category having a largest feature similarity with the image to be classified belongs.

Item 20. The apparatus according to Item 19, wherein the classifying unit is configured to average the features of the image to be classified, and calculate the feature similarity based on the averaged features.

The invention claimed is:

1. An information processing apparatus, comprising:
a first classification loss calculating unit configured to input each sample image in a training set into a machine learning architecture to obtain a first feature of the sample image, and to cause a first classifier to calculate a first classification loss of the sample image based on the first feature;
an entropy loss calculating unit configured to calculate a second feature based on the first feature and a predetermined first mask, and to input the second feature into the first classifier to calculate an entropy loss of class probability distribution;
a mask calculating unit configured to calculate a second mask based on the first mask and the entropy loss to maximize the entropy loss;
an adversarial feature obtaining unit configured to obtain an adversarial feature based on the first feature and the second mask, wherein the adversarial feature is complementary to the second feature;
a second classification loss calculating unit configured to cause, by training the first classifier and the second classifier in association with each other, the second classifier to calculate a second classification loss of the sample image based on the adversarial feature; and
a training unit configured to adjust, by minimizing a sum of the first classification loss and the second classification loss, parameters of the machine learning architecture, the first classifier and the second classifier, to obtain a trained machine learning architecture.

2. The information processing apparatus according to claim 1, wherein the mask calculating unit is configured to calculate the second mask based on a gradient of the entropy loss with respect to the first mask.

3. The information processing apparatus according to claim 1, wherein the mask calculating unit is configured to calculate, with a Long Short-Term Memory Model (LSTM), the second mask based on the entropy loss and the first mask.

4. The information processing apparatus according to claim 1, wherein the training the first classifier and the second classifier in association with each other comprises: causing parameters of the second classifier to comprise parameters of the first classifier, and causing the second classifier to calculate the second classification loss of the sample image based only on the adversarial feature.

5. The information processing apparatus according to claim 1, wherein the training the first classifier and the second classifier in association with each other comprises: causing parameters of the second classifier not to comprise parameters of the first classifier, and causing the second classifier to calculate the second classification loss of the sample image based on both the second feature and the adversarial feature.

6. The information processing apparatus according to claim 1, wherein the adversarial feature obtaining unit is configured to average features obtained after multiplying the first feature with the second mask, to obtain the adversarial feature.

7. The information processing apparatus according to claim 1, wherein the entropy loss calculating unit is configured to average features obtained after multiplying the first feature with the first mask, to obtain the second feature.

8. The information processing apparatus according to claim 1, the first feature is a three-dimensional feature.

9. The information processing apparatus according to claim 1, wherein the machine learning architecture is a neural network architecture.

10. An apparatus for performing classification with the trained machine learning architecture obtained by the information processing apparatus according to claim 1, comprising:
a feature extracting unit configured to input an image to be classified into the trained machine learning architecture, to extract a feature of the image to be classified; and
a classifying unit configured to calculate feature similarities between the feature of the image to be classified and features of images of known categories, and to classify the image to be classified into a category to which an image of a known category having a largest feature similarity with the image to be classified belongs.

11. The apparatus according to claim 10, wherein the classifying unit is configured to average the features of the image to be classified, and calculate the feature similarity based on the averaged features.

12. An information processing method, comprising:
a first classification loss calculating step of inputting ach sample image in a training set into a machine learning architecture to obtain a first feature of the sample image, and causing a first classifier to calculate a first classification loss of the sample image based on the first feature;
an entropy loss calculating step of calculating a second feature based on the first feature and a predetermined first mask, and inputting the second feature into the first classifier to calculate an entropy loss of class probability distribution;
a mask calculating step of calculating a second mask based on the first mask and the entropy loss to maximize the entropy loss;
an adversarial feature obtaining step of obtaining an adversarial feature based on the first feature and the second mask, wherein the adversarial feature is complementary to the second feature;
a second classification loss calculating step of causing, by training the first classifier and the second classifier in association with each other, the second classifier to calculate a second classification loss of the sample image based on the adversarial feature; and
to a training step of adjusting, by minimizing a sum of the first classification loss and the second classification loss, parameters of the machine learning architecture, the first classifier and the second classifier, to obtain a trained machine learning architecture.

13. The information processing method according to claim 12, wherein in the mask calculating step, the second mask is calculated based on a gradient of the entropy loss with respect to the first mask.

14. The information processing method according to claim 12, wherein in the mask calculating steps, the second mask is calculated based on the entropy loss and the first mask with a Long Short-Term Memory Model (LSTM).

15. The information processing method according to claim 12, wherein the training the first classifier and the second classifier in association with each other comprises: causing parameters of the second classifier to comprise parameters of the first classifier, and causing the second classifier to calculate the second classification loss of the sample image based only on the adversarial feature.

16. The information processing method according to claim 12, wherein the training the first classifier and the second classifier in association with each other comprises: causing parameters of the second classifier not to comprise parameters of the first classifier, and causing the second classifier to calculate the second classification loss of the sample image based on both the second feature and the adversarial feature.

17. The information processing method according to claim 12, wherein in the adversarial feature obtaining step, features obtained after multiplying the first feature with the second mask are averaged, to obtain the adversarial feature.

18. The information processing method according to claim 12, wherein in the entropy loss calculating step, features obtained after multiplying the first feature with the first mask are averaged, to obtain the second feature.

19. The information processing method according to claim 12, wherein the first feature is a three-dimensional feature.

20. The information processing method according to claim 12, wherein the machine learning architecture is a neural network architecture.

\* \* \* \* \*